UNITED STATES PATENT OFFICE.

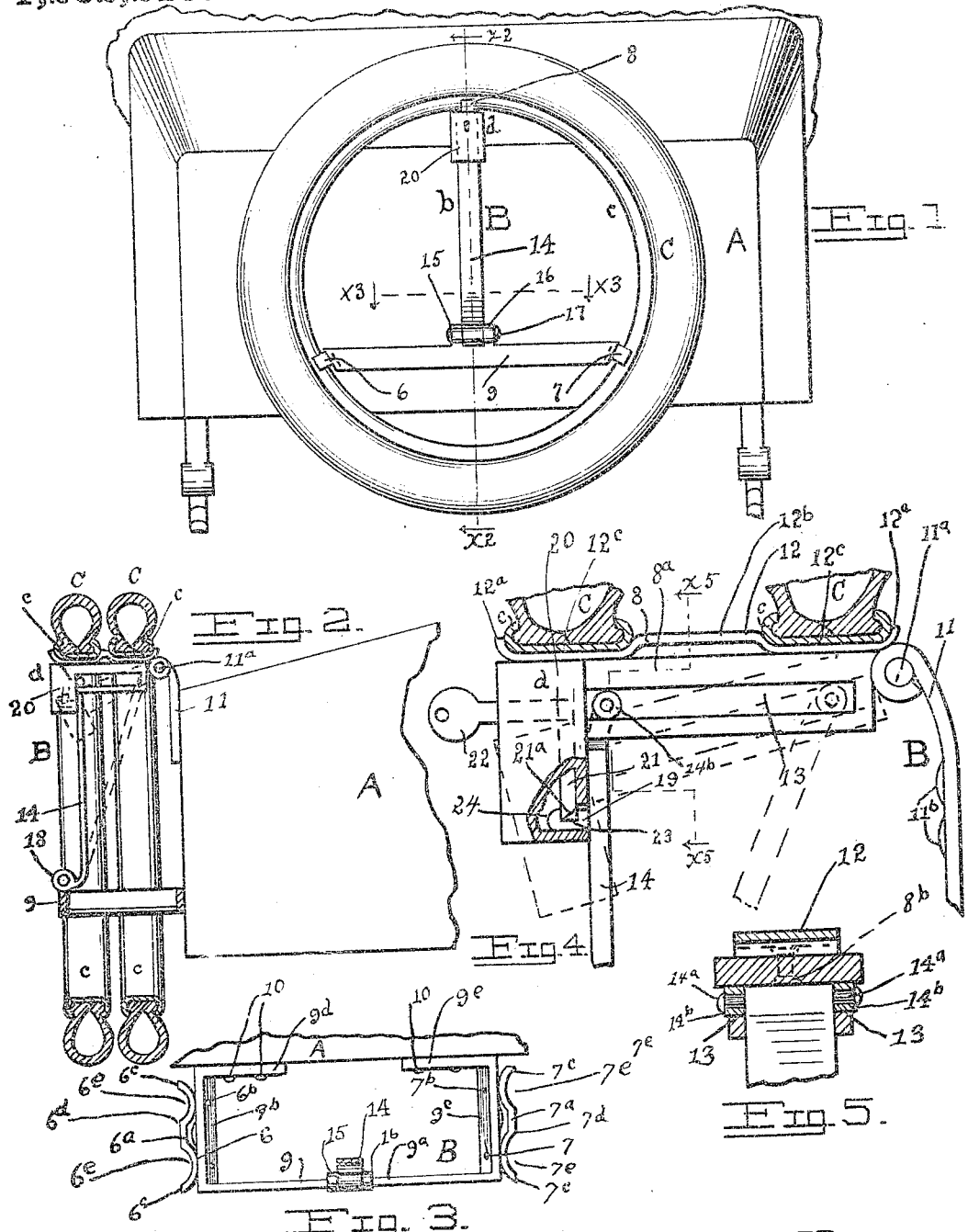

OTTO WILLIAM LAKE, OF VISALIA, CALIFORNIA.

TIRE-DEVICE CARRIER.

1,262,215.

Specification of Letters Patent.   Patented Apr. 9, 1918.

Application filed February 13, 1917.   Serial No. 148,307.

*To all whom it may concern:*

Be it known that I, OTTO WILLIAM LAKE, a citizen of the United States, residing at Visalia, in the county of Tulare and State of California, have invented new and useful Improvements in Tire-Device Carriers, of which the following is a specification.

This invention relates to tire device carriers, and has for its object to provide a carrier for use in connection with vehicles whereby spare tires or tire devices may be carried and held against removal by unauthorized persons. In accordance with the invention a plurality of relatively movable members adapted for engagement with the rim of a vehicle tire are provided and means for locking such members or one of the same in engagement with the rim are likewise provided. In tire carriers as ordinarily constructed, a tire to be held therein is engaged at its periphery and various devices resorted to for preventing the dislodgment of the same, this invention differing from such other devices in that the rim is preferably internally engaged by holding members from which it cannot be removed until one of such members has been unlocked and properly manipulated. By engaging the rim at more than two points the rim with the tire carried thereby is properly centered on the device and may be tightly gripped upon causing the expansion or extension of one of the gripping members, such members being formed for interlocking engagement with the rim; furthermore, to facilitate the application of the members to the rim under the proper degree of pressure, means are provided in angular relation to the movable gripping member whereby a cam or inclined plane action is employed for finally setting the rim. In the form of the invention shown in the drawing, provision is made for the accommodation of a plurality of rims with their tires in a single device and such device is shown as applied to the rear end of a motor vehicle body, though devices organized in accordance with the invention may be suitably formed for application to the vehicle or the body at any other suitable point.

A further object of the invention is to provide a carrier of the general character stated which will be relatively simple and inexpensive in construction and organization when its advantages such as facility in attachment, positiveness in operation, and general superiority and serviceability are considered.

With the above and other objects in view, the invention consists in the novel and useful provision, formation, combination, association and relative arrangement of parts, members and features, all as hereinafter described, shown in the drawing, and finally pointed out in claims.

In the drawing:

Figure 1 is a fragmentary view of the rear end of a motor vehicle body equipped with a carrier constructed and organized in accordance with the invention;

Fig. 2 is a central vertical sectional view through the carrier shown in Fig. 1, taken on the line $x^2$—$x^2$, Fig. 1, and looking in the direction of the appended arrows;

Fig. 3 is a fragmentary horizontal sectional view taken on the line $x^3$—$x^3$, Fig. 1, showing a pair of projecting lower carrier members;

Fig. 4 is an enlarged fragmentary view of a portion of the showing in Fig. 2; and Fig. 5 is a sectional view taken on the line $x^5$—$x^5$, Fig. 4.

Corresponding parts in all the figures are designated by the same reference characters.

Referring with particularity to the drawing, in the embodiment of the invention therein shown, A designates the body of a motor vehicle, B designates a carrier, and C designates in each instance a vehicle tire mounted upon its rim $c$.

The carrier B is shown as comprising a member 6, a member 7, and a member 8 each adapted for engagement with the rim $c$, releasable means $b$ for causing relative movement of one of said members with respect to the other two of such members, and means $d$ for positively locking said member in extended rim-engaging position. The member 6 is formed at one end of a bent horizontal metallic strip 9 which has a portion $9^a$ ranging parallel to the body of the vehicle and which is bent inwardly toward the vehicle body as at $9^b$ at the end forming the member 6 and is likewise bent inwardly at the other end as at $9^c$ to form the member 7. The extreme ends $9^d$ and $9^e$ of the strip 9 are bent to fit against the body A of the vehicle to which they are secured by rivets, bolts or the like 10. The member 6 preferably includes a metallic strip $6^a$ riveted to the portion $9^d$ of the strip 9 as at $6^b$, and bent to provide outer retaining fingers $6^c$ at its ends, and an intermediate retaining finger $6^d$ between its ends such strip 6ᵃ thus being formed with rim-receiving recesses 6ᵉ between the retaining fingers 6ᶜ and the finger 6ᵈ. The member 7 likewise includes a metallic strip 7ᵃ riveted to the portion 9ᶜ of the strip 9 as at 7ᵇ and such strip 7ᵃ is of a formation similar to the strip 6ᵃ so that fingers 7ᶜ and 7ᵈ are provided to form rim-receiving notches or recesses 7ᵉ. The member 8 comprises a normally horizontally disposed bar 8ᵃ pivoted at its end nearest the vehicle body A to a metallic strip 11 as at 11ᵃ, and a strip 12 riveted to the bar 8ᵃ as at 8ᵇ. The strip 12 is formed similarly to the strips 6ᵃ and 7ᵃ of the respective members 6 and 7 with end fingers 12ᵃ and an intermediate finger or projection 12ᵇ, rim-receiving recesses 12ᶜ being thus provided. The strip 11 is secured to the vehicle body as by rivets or bolts 11ᵇ. The bar 8ᵃ is formed with a pair of longitudinally ranging slots or guideways 13 and has secured thereto at its outer end the locking means d. The releasable means b is shown as a pivoted member 14 secured to the strip 9 between ears 15 and 16 on the same by means of a pivot 17 passed through such ears and through a suitable pivot-receiving orifice 18 which may be formed by bending the member 14 to snugly embrace the pivot 17. The other end of the member 14 is provided with laterally extending pivots 14ᵃ on each of which is rotatably mounted a roller 14ᵇ. Each roller 14ᵇ is arranged to run in a guide-way 13 provided in the bar 8ᵃ. The member 14 is provided with a laterally extending catch 19 comprised within the locking means d. The locking means d preferably comprises a lock of standard construction having a casing 20 which is secured to the outer end of the bar 8ᵃ and having a bolt 21 adapted to be retracted by means of a key 22. The bolt 21 is adapted to take into a notch 23 provided in the catch 19 on the member 14, such catch having a rounded nose 24 adapted to automatically lift the lock bar when the member 14 is moved about its pivot to project the catch into the lock casing 20. The lock bar is beveled at one of its faces as at 21ᵃ to permit such automatic engagement.

The operation, method of use and advantages of the invention will be readily understood from the foregoing description taken in connection with the accompanying drawing and the following statement:

To place a tire or a plurality of tires on the carrier it is only necessary that a proper key be inserted in the locking means d to retract the bolt 21 whereupon the member 14 may be easily pressed inwardly and, due to the engagement of the rollers 14ᵇ with the ways of the bar 8ᵃ, such bar will be drawn downwardly or moved about its pivot 11ᵃ upon the inward movement of the member 14 as the same is oscillated about its pivot 17. When the member 14 is in its inner position and the bar 8ᵃ slants downwardly, as indicated in dotted lines in Fig. 2, the tires with their rims may be readily removed from the carrier as the members 6, 7 and 8 will be in relatively collapsed position. To replace a tire or the tires on the carrier all that is necessary is to slip the rim or rims thereof over the members 6, 7 and 8 and in registration with the recesses in such members, which recesses for each tire lie in a common plane, and then by pulling on the member 14 draw the same outwardly, raising the bar 8ᵃ or the member 8 comprising the bar, and causing the entrance of the catch 19 into the lock casing 20 through a suitable orifice provided therein and causing the engagement of the same by the lock bolt 21 which automatically moves to accommodate the catch 19. In the movement of the member 14 toward the lock a cam action is had at the point of contact of such member, through its rollers, with the member 8 or the bar 8ᵃ thereof and the tires may be firmly and securely gripped under pressure by the members 6, 7 and 8, thus preventing any relative movement as between tires and carrier. The member 14 being curved inwardly as shown in Fig. 2 has a limited amount of resiliency which provides a proper pressure to grip the tires. The tires once in position cannot readily be removed without inserting the proper key in the locking means to again release the catch 19 from the lock bar 21.

Having thus disclosed my invention, I claim and desire to secure by Letters Patent:

1. A tire device carrier comprising a plurality of members adapted to be engaged with the tire device and one of said members being pivotally mounted at one end, a releasable means pivotally supported at one end and having coöperative movement at its opposite end longitudinally of said pivotally mounted member for positively locking the said members in holding engagement with the tire device, and lock controlled mechanism carried by said member coöperating with said releasable means for locking said releasable means from movement.

2. A tire device carrier, comprising a plurality of members adapted to be engaged with the tire device and one pivotally mounted for movement relatively to the others, releasable means for locking said members in holding engagement with the tire device by the pivotal movement of said movable member, and means carried by said pivotal member for engaging and locking said releasable means against release, said releasable means comprising a pivotal member coöperating at its free end with said pivoted tire device engaging member to slide longitudinally thereof in engagement therewith.

3. A tire device carrier, comprising a plurality of members adapted to be engaged with the tire device and one of said members being pivotally mounted, releasable means for locking said pivoted member in holding engagement with the tire device, and means for locking said releasable means against release; said releasable means comprising a pivoted member having sliding inter-engagement at its free end longitudinally of said pivoted tire device engaging member and adapted to move said pivotally mounted member into tire device-engaging position, in which position said member is locked by engagement with said releasable means.

4. A tire device carrier, comprising a plurality of members fixedly mounted upon a vehicle, a relatively movable member pivotally mounted upon said vehicle, and a prop pivotally connected to said fixedly mounted members and having sliding interlocked engagement at its free end with said pivoted member whereby said pivoted member may be retracted by said prop upon movement of said prop in one direction and whereby said pivoted member may be moved to extended tire device-holding position upon movement of the prop in the other direction, and means for locking said prop and said pivoted member together when said pivoted member is in extended position.

In testimony whereof, I have signed my name to this specification in the presence of two subscribing witnesses.

OTTO WILLIAM LAKE.

Witnesses:
C. L. BRADLEY,
W. F. BRADLEY.